US009081107B2

(12) United States Patent
Abma et al.

(10) Patent No.: US 9,081,107 B2
(45) Date of Patent: Jul. 14, 2015

(54) SHOT SCHEDULING LIMITS FOR SEISMIC ACQUISITION WITH SIMULTANEOUS SOURCE SHOOTING

(75) Inventors: Raymond Lee Abma, Houston, TX (US); Gerard Joseph Beaudoin, Houston, TX (US); Zhiyong Jiang, Katy, TX (US)

(73) Assignee: BP Corporation North America Inc., Houston, TX (US)

( * ) Notice: Subject to any disclaimer, the term of this patent is extended or adjusted under 35 U.S.C. 154(b) by 714 days.

(21) Appl. No.: 13/349,312

(22) Filed: Jan. 12, 2012

(65) Prior Publication Data

US 2012/0176861 A1 Jul. 12, 2012

Related U.S. Application Data

(60) Provisional application No. 61/431,943, filed on Jan. 12, 2011.

(51) Int. Cl.
*G01V 1/38* (2006.01)
*G01V 1/28* (2006.01)
*G01V 1/00* (2006.01)

(52) U.S. Cl.
CPC ...................................... *G01V 1/005* (2013.01)

(58) Field of Classification Search
CPC ........... G01V 1/28; G01V 1/30; G01V 1/288; G01V 1/3808; G01V 2210/32; G01V 1/32; G01V 1/18; G01V 1/37; G01V 3/38; E21B 28/00; E21B 41/0092; E21B 43/00; E21B 43/003; E21B 43/16; E21B 47/00
USPC ........... 367/14, 15, 21, 23, 25, 27, 35, 37, 38, 367/40, 41, 43, 46, 47, 50, 53, 56, 57, 63, 367/64, 68, 69, 77, 81, 83, 140, 143, 144, 367/182, 189; 166/66, 369, 249; 702/5, 15, 702/16, 17, 147
See application file for complete search history.

(56) References Cited

U.S. PATENT DOCUMENTS 4,147,228 A * 4/1979 Bouyoucos ................... 181/119
4,486,866 A * 12/1984 Muir .............................. 367/39

(Continued)

FOREIGN PATENT DOCUMENTS

WO 2008112036 A1 9/2008
WO 2010014118 A1 4/2010

OTHER PUBLICATIONS

Ozdogan Yilmaz, "Seismic Data Processing", Society of Exploration of Geophysicists, 1987, Chapter 1, pp. 9-80, Tulsa, Oklahoma, USA.
Ozdogan Yilmaz, "Seismic Data Processing", Society of Exploration of Geophysicists, 1987, Chapter 6, pp. 384-427, Tulsa, Oklahoma, USA.

(Continued)

*Primary Examiner* — Isam Alsomiri
*Assistant Examiner* — Amienatta M Ndure Jobe
(74) *Attorney, Agent, or Firm* — Gunnar Heinisch

(57) ABSTRACT

According to an embodiment of the instant invention there is provided a method for collecting a blended source seismic survey that utilizes new approach to determining a random time separation between successive shots. The random time separation may be drawn in some embodiments from a distribution of uniformly distributed numbers, with $\tau > 1/(2\ f)$, where $\tau$ is the half-width of the uniform distribution and f is the lowest frequency of interest in the survey.

13 Claims, 5 Drawing Sheets

(56) References Cited

U.S. PATENT DOCUMENTS

| | | | |
|---|---|---|---|
| 4,534,020 A * | 8/1985 | O'Brien | 367/188 |
| 5,563,949 A * | 10/1996 | Bahorich et al. | 702/16 |
| 5,940,778 A * | 8/1999 | Marfurt et al. | 702/16 |
| 8,553,496 B2 * | 10/2013 | Decker et al. | 367/40 |
| 2007/0274155 A1 | 11/2007 | Ikelle | |
| 2009/0010103 A1 * | 1/2009 | Sallas et al. | 367/41 |

OTHER PUBLICATIONS

PCT International Search Report and Written Opinion of the International Searching Authority mailed on May 16, 2012, in related International application No. PCT/US2012/021031, 11 pages.

\* cited by examiner

SHOT SCHEDULING LIMITS FOR SEISMIC ACQUISITION WITH SIMULTANEOUS SOURCE SHOOTING

RELATED CASE

This application claims the benefit of U.S. Provisional Patent Application Ser. No. 61/431,943 filed on Jan. 12, 2011, and incorporates said application by reference into this disclosure as if fully set out at this point.

TECHNICAL FIELD

This invention relates to the general subject of seismic exploration and, in particular, to methods for estimating seismic and other signals that are representative of the subsurface.

BACKGROUND OF THE INVENTION

A seismic survey represents an attempt to image or map the subsurface of the earth by sending sound energy down into the ground and recording the "echoes" that return from the rock layers below. The source of the down-going sound energy might come, for example, from explosions or seismic vibrators on land, or air guns in marine environments. During a seismic survey, the energy source is placed at various locations near the surface of the earth above a geologic structure of interest. Each time the source is activated, it generates a seismic signal that travels downward through the earth, is reflected, and, upon its return, is recorded at a great many locations on the surface. Multiple source/recording combinations are then combined to create a near continuous profile of the subsurface that can extend for many miles. In a two-dimensional (2-D) seismic survey, the recording locations are generally laid out along a single line, whereas in a three dimensional (3-D) survey the recording locations are distributed across the surface in a grid pattern. In simplest terms, a 2-D seismic line can be thought of as giving a cross sectional picture (vertical slice) of the earth layers as they exist directly beneath the recording locations. A 3-D survey produces a data "cube" or volume that is, at least conceptually, a 3-D picture of the subsurface that lies beneath the survey area. In reality, though, both 2-D and 3-D surveys interrogate some volume of earth lying beneath the area covered by the survey. Finally, a time lapse (often referred to as a 4-D) survey is one that is taken over the same subsurface target at two or more different times. This might be done for many reasons but often it is done to measure changes in subsurface reflectivity over time which might be caused by, for example, the progress of a fire flood, movement of a gas oil or oil/water contact, etc. Obviously, if successive images of the subsurface are compared any changes that are observed (assuming differences in the source signature, receivers, recorders, ambient noise conditions, etc., are accounted for) may be attributable to the progress of the subsurface processes that is at work.

A seismic survey is composed of a very large number of individual seismic recordings or traces. In a typical 2-D survey, there may usually be several tens of thousands of traces, whereas in a 3-D survey the number of individual traces may run into the multiple millions of traces. Chapter 1, pages 9-89, of Seismic Data Processing by Ozdogan Yilmaz, Society of Exploration Geophysicists, 1987, contains general information relating to conventional 2-D processing and that disclosure is incorporated herein by reference. General background information pertaining to 3-D data acquisition and processing may be found in Chapter 6, pages 384-427, of Yilmaz, the disclosure of which is also incorporated herein by reference.

A seismic trace is a digital recording of the acoustic energy reflecting from inhomogeneities or discontinuities in the subsurface, a partial reflection occurring each time there is a change in the elastic properties of the subsurface materials. The digital samples are usually acquired at 0.002 second (2 millisecond or "ms") intervals, although 4 milliseconds and 1 millisecond sampling intervals are also common. Each discrete sample in a conventional digital seismic trace is associated with a travel time, and in the case of reflected energy, a two-way travel time from the source to the reflector and back to the surface again, assuming, of course, that the source and receiver are both located on the surface. Many variations of the conventional source-receiver arrangement are used in practice, e.g. VSP (vertical seismic profiles) surveys, ocean bottom surveys, etc. Further, the surface location of every trace in a seismic survey is carefully tracked and is generally made a part of the trace itself (as part of the trace header information). This allows the seismic information contained within the traces to be later correlated with specific surface and subsurface locations, thereby providing a means for posting and contouring seismic data—and attributes extracted therefrom—on a map (i.e., "mapping").

The data in a 3-D survey are amenable to viewing in a number of different ways. First, horizontal "constant time slices" may be extracted from a stacked or unstacked seismic volume by collecting all of the digital samples that occur at the same travel time. This operation results in a horizontal 2-D plane of seismic data. By animating a series of 2-D planes it is possible for the interpreter to pan through the volume, giving the impression that successive layers are being stripped away so that the information that lies underneath may be observed. Similarly, a vertical plane of seismic data may be taken at an arbitrary azimuth through the volume by collecting and displaying the seismic traces that lie along a particular line. This operation, in effect, extracts an individual 2-D seismic line from within the 3-D data volume. It should also be noted that a 3-D dataset can be thought of as being made up of a 5-D data set that has been reduced in dimensionality by stacking it into a 3-D image. The dimensions are typically time (or depth "z"), "x" (e.g., North-South), "y" (e.g., East-West), source-receiver offset in the x direction, and source-receiver offset in the y direction. While the examples here may focus on the 2-D and 3-D cases, the extension of the process to four or five dimensions is straightforward.

Seismic data that have been properly acquired and processed can provide a wealth of information to the explorationist, one of the individuals within an oil company whose job it is to locate potential drilling sites. For example, a seismic profile gives the explorationist a broad view of the subsurface structure of the rock layers and often reveals important features associated with the entrapment and storage of hydrocarbons such as faults, folds, anticlines, unconformities, and sub-surface salt domes and reefs, among many others. During the computer processing of seismic data, estimates of subsurface rock velocities are routinely generated and near surface inhomogeneities are detected and displayed. In some cases, seismic data can be used to directly estimate rock porosity, water saturation, and hydrocarbon content. Less obviously, seismic waveform attributes such as phase, peak amplitude, peak-to-trough ratio, and a host of others, can often be empirically correlated with known hydrocarbon occurrences and that correlation applied to seismic data collected over new exploration targets.

Of course, one well-known problem with seismic data is that it is can be expensive to acquire. Indeed, in some cases the cost of the survey may determine whether or not the economics of the proposed target are favorable. Thus, techniques that tend to reduce the cost of such surveys are always welcome.

Spaced firing of two or more sources has been recognized as one strategy for reducing the cost of seismic data acquisition. The basic idea behind this approach is that a receiver line or patch may be deployed and that multiple sources may be sequentially or simultaneously activated during a single recording period. Thus, subsurface reflections from an early source excitation may be comingled with those that have been sourced later, i.e., a "blended source" survey is acquired. Note that this is in stark contrast to conventional surveying techniques, wherein the returning subsurface reflections from one source would never be allowed to overlap the reflections of another.

Although the blended source approach has the potential to dramatically reduce the time in the field, thereby reducing the cost of the survey proportionally, one obvious problem is that it can be difficult to separate the individual shots thereafter. Said another way, what is of critical importance in interpreting seismic data is the depth of each reflector. Generally speaking, depth of a reflector is determined by reference to its two-way seismic travel time. So, in a multiple source survey it is of the highest priority to determine which of the observed subsurface reflections is associated with each source, otherwise its two-wave travel time cannot be reliably determined.

In addition to planned blended source surveys, in some cases unplanned multiple source recordings may be acquired. For example, in areas of intense exploration activity there may be several crews shooting in the same general area. This may be of particular concern in marine areas where multiple seismic boats may be active simultaneously. Traditionally when a seismic record contains energy from a third party source some attempt is made to mute the part of the signal that contains the unwanted source so that it does not spread to adjacent records via multi-trace processing algorithms such as migration. However, such muting eliminates both the interfering noise and useful reflections that might occur at or near the same reflection time. Although it is known to try to replace the muted regions by interpolation from unmuted data, such is at best an approximation to the data that have been lost.

Separating the two or more shots from a single seismic recording has been predictably problematic. Shot scheduling during acquisition has shown some promise in terms of improving the separability of simultaneously acquired shots, and this has been especially so where the time interval between successive shots is at least somewhat random. However, this approach has not proved to be as useful, at least in part because heretofore there has not been a reliable way to determine how much "randomness" in the time separations would produce an optimal (or even a good) result. Further refinements of this approach are clearly necessary.

Heretofore, as is well known in the seismic acquisition, processing, and interpretation arts, there has been a need for a method of separating two or more seismic sources that have been activated during a single recording. Accordingly, it should now be recognized, there exists, and has existed for some time, a very real need for a method of seismic data processing that would address and solve the above-described problems.

Before proceeding to a description of the present invention, however, it should be noted and remembered that the description of the invention which follows, together with the accompanying drawings, should not be construed as limiting the invention to the examples (or embodiments) shown and described. This is so because those skilled in the art to which the invention pertains will be able to devise other forms of this invention within the ambit of the appended claims.

SUMMARY OF THE INVENTION

According to an aspect of the instant invention, there is provided a system and method for simultaneously operating multiple seismic sources during acquisition in such a way that post-survey shot separation can be more expeditiously performed. In particular, in one variation this invention utilizes a measure of the lowest expected or desired frequency in the survey to determine an acceptable minimum random component to the time separation between successive shot activations. In some embodiments the distribution of uniformly distributed shot time separations will be chosen in such a way that $\tau>1/(2 f)$, where $\tau$ is the half-width of the uniform distribution and f is the lowest frequency of interest. In some embodiments, the half width will be centered about zero (or otherwise include zero) so that both positive and negative values could potentially be obtained. In other embodiments, the uniform distribution might cover only positive values.

During acquisition and according to one embodiment, source excitations that occur within the same recording may be separated by random time intervals, where the interval between successive shots is some function of the expected frequency content of the data. When overlapping sources are acquired according to embodiments of the method, the energy from near coincident shots will be less likely to contain coherent energy, thus making them more likely to be separable thereafter. By activating the shots at random times, when these shots are corrected to their individual time-zeros they will have signals that are coherent from source point to source point, while the interfering shots will tend to be incoherent and may be separated by, for example, an inversion process. This strengthens the operation of the coherency measures in the instant separation process.

Thus, in the one embodiment, the application of the instant acquisition method provides reasonably clean shot gathers that may be used both for imaging and prestack analysis such as AVO (Amplitude Vs. Offset) analysis.

Acquiring seismic data with shots where the recorded information from one shot overlaps in time with other shots has the potential to significantly reduce the time (and cost) for shooting a seismic survey. This approach might also allow more closely spaced shot point intervals (e.g., during a marine survey) which could potentially provide better seismic images that would improve the chances of discovering economic quantities of oil and/or gas.

In an embodiment, a method of seismic exploration above a region of the subsurface containing structural or stratigraphic features conducive to the presence, migration, or accumulation of hydrocarbons comprises (a) determining a lowest frequency of interest in a blended source seismic survey. The method also comprises (b) using said lowest frequency of interest to determine a value representative of variability of a probability distribution. The method additionally comprises (c) initiating a recording of at least one seismic receiver positioned proximate to the region of the subsurface. Furthermore, the method comprises (d) activating a first seismic source. Moreover, the method comprises (e) recording the first seismic source through the at least one of seismic receiver. The method also comprises (f) determining a random period of time using the probability distribution and the determined variability. The method further comprises (g) waiting a period of time at least approximately equal to the random period of time after the first seismic source activation and then activating a second seismic source. Additionally, the method comprises (h) recording the second seismic source through the at least one seismic receiver. The method also comprises performing at least (d) through (h) a plurality of times, thereby acquiring a blended source seismic survey; and, using the blended source seismic survey to explore for hydrocarbons within the region of the subsurface.

In an embodiment, a method of acquiring a blended source seismic survey above a region of the subsurface containing structural or stratigraphic features conducive to the presence, migration, or accumulation of hydrocarbons comprises (a) determining a lowest frequency of interest in the blended source seismic survey. The method also comprises (b) using the lowest frequency of interest to determine a value representative of at least one parameter of a probability distribution. The method further comprises (c) initiating a recording of at least one seismic receiver situated proximate to the region of the subsurface. In addition, the method comprises (d) activating a first seismic source. The method also comprises (e) using the at least one seismic receiver to record one or more reflections sourced by the first seismic source activation. Moreover, the method comprises (f) using the probability distribution and the value representative of at least one parameter of the probability distribution to determine a time delay. The method also comprises (g) waiting a period of time at least approximately equal to the time delay after the first source activation before activating a second seismic source. The method comprises (h) recording the second seismic source through the at least one seismic receiver. Furthermore, the method comprises performing at least (d) through (h) a plurality of times, thereby acquiring a blended source seismic survey; and, using at least a portion of the blended source seismic survey to explore for hydrocarbons within the region of the subsurface.

In another embodiment, a method of simultaneous source seismic acquisition comprises positioning a plurality of seismic sources proximate to one or more subterranean formations. The method also comprises determining a pseudo-random distribution of time intervals between initiation of each seismic source based on a lowest frequency of interest. The method additionally comprises firing the seismic sources according to the pseudo-random time distribution. Furthermore, the method comprises recording a plurality of seismic signals reflected from the one or more subterranean formations; and, forming a visually perceptible image of any of said recorded plurality of seismic signals.

In yet another embodiment, a method of seismic exploration, comprises (a) accessing at least a portion of a blended source seismic survey taken above a region of the subsurface containing structural or stratigraphic features conducive to the presence, migration, or accumulation of hydrocarbons, wherein the blended source seismic survey is collected by (1) determining a lowest frequency of interest in the blended source seismic survey; (2) using the lowest frequency of interest to determine a value representative of variability of a probability distribution; (3) initiating a recording of at least one seismic receiver positioned proximate to the region of the subsurface; (4) activating a first seismic source; (5) recording the first seismic source through the at least one of seismic receiver; (6) determining a random period of time using the probability distribution and the determined variability; (7) waiting a period of time at least approximately equal to the random period of time after the first seismic source activation and then activating a second seismic source; (8) recording the second seismic source through the at least one seismic receiver; and, (9) performing at least (4) through (8) a plurality of times, thereby acquiring the blended source seismic survey. The method also comprises (b) using at least a portion of the blended source seismic survey to explore for hydrocarbons within the region of the subsurface.

In an embodiment, a seismic system comprises a plurality of seismic sources; and a controller operatively coupled to each of the seismic sources The controller is programmed to fire the seismic sources according to a pseudo-random distribution of time intervals between initiation of each seismic source. The pseudo-random time distribution being chosen based on a lowest frequency of interest.

The foregoing has outlined in broad terms the more important features of the invention disclosed herein so that the detailed description that follows may be more clearly understood, and so that the contribution of the instant inventor to the art may be better appreciated. The instant invention is not to be limited in its application to the details of the construction and to the arrangements of the components set forth in the following description or illustrated in the drawings. Rather, is the disclosed method is capable of other embodiments and of being practiced and carried out in various other ways not specifically enumerated herein. Finally, it should be understood that the phraseology and terminology employed herein are for the purpose of description and should not be regarded as limiting, unless the specification specifically so limits the invention.

BRIEF DESCRIPTION OF THE DRAWINGS

Other objects and advantages of the invention will become apparent upon reading the following detailed description and upon reference to the drawings in which.

DETAILED DESCRIPTION

Figure 1:
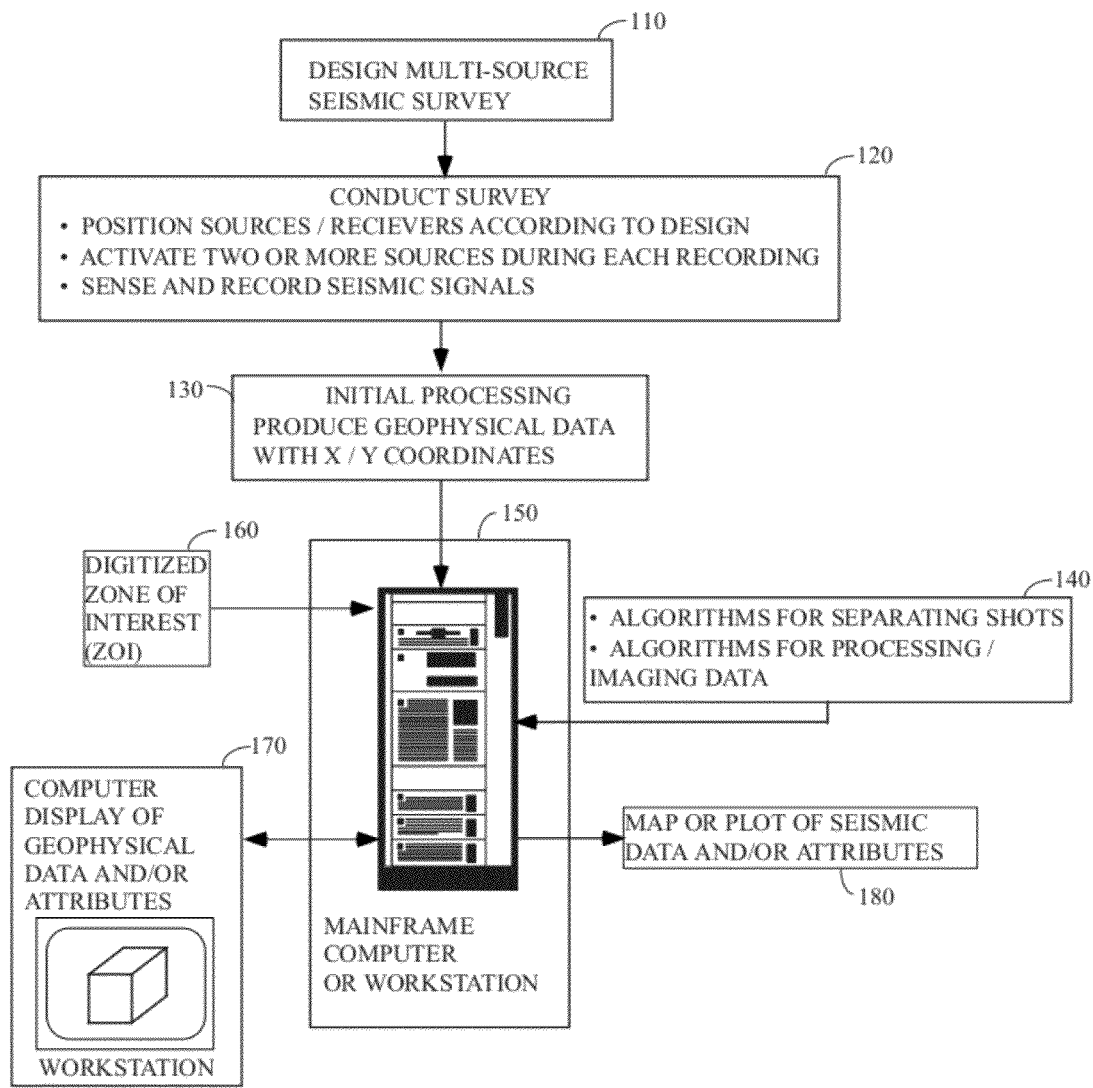
FIG. 1 illustrates the general environment of embodiments of the disclosed method.

While this invention is susceptible of embodiment in many different forms, there is shown in the drawings, and will herein be described hereinafter in detail, some specific embodiments of the instant invention. It should be understood, however, that the present disclosure is to be considered an exemplification of the principles of the invention and is not intended to limit the invention to the specific embodiments or algorithms so described.

General Environment of the Invention

FIG. 1 illustrates the general environment in which embodiments of the instant invention may typically be used. A seismic survey is designed 110 by the explorationist to cover an area of economic interest. Field acquisition parameters (e.g., shot spacing, line spacing, fold, etc.) are typically selected in conjunction with this step, although it is common to modify the ideal design parameters slightly (or substantially) in the field to accommodate the realities of conducting the survey.

Seismic data (i.e., seismic traces) are collected in the field 120 over a subsurface target of potential economic importance and are typically sent thereafter to a processing center 150 where the traces will be subjected to various algorithms to make them more suitable for use in exploration. In some cases, there may be some amount of initial data processing performed while the data are still in the field and this is becoming more common and feasible given the computing power that is available to field crews.

Note that embodiments of the method may be utilized during step 110 (i.e., the survey design) or during the acquisition (step 120) depending on whether the time separations between successive shots are determined in the explorationist's office, in the field, or some combination of the two locations.

In the processing center a variety of preparatory processes 130 are typically applied to the seismic traces to make them ready for use by the explorationist. The processed traces would then be made available for use by embodiments of the method and might be stored, by way of example only, on hard disk, magnetic tape, magneto-optical disk, DVD disk, or other mass storage means.

The methods disclosed herein would best be implemented in the form of a computer program 140 that has been loaded onto a programmable computer 150 where it is accessible by a seismic interpreter or processor. Note that a computer 150 suitable for use with embodiments of the method would typically include, in addition to mainframes, servers, and workstations, super computers and, more generally, a computer or network of computers that provide for parallel and massively parallel computations, wherein the computational load is distributed between two or more processors. As is also illustrated in FIG. 1, in one arrangement some sort of digitized zone of interest model 160 may be specified by the user and provided as input to the processing computer program. In the case of a 3-D seismic section, the zone of interest model 160 would typically include specifics as to the lateral extent and thickness (which might be variable and could be measured in time, depth, frequency, etc.) of a subsurface target. The exact means by which such zones are created, picked, digitized, stored, and later read during program execution is unimportant to the instant invention and those skilled in the art will recognize that this might be done any number of ways.

A program 140 embodying embodiments of the method might be conveyed into the computer that is to execute it by means of, for example, a floppy disk, a magnetic disk, a magnetic tape, a magneto-optical disk, an optical disk, a CD-ROM, a DVD disk, a RAM card, flash RAM, a RAM card, a PROM chip, or loaded over a network. In a typical seismic processing environment, the methods of the instant invention would be made part of a larger package of software modules that is designed to perform many of the processing steps listed in FIG. 2. After processing by the instant methods, the resulting traces would then typically be sorted into gathers, stacked, and displayed either at a high resolution color computer monitor 170 or in hard-copy form as a printed seismic section or a map 180. The seismic interpreter would then use the displayed images to assist him or her in identifying subsurface features conducive to the generation, migration, or accumulation of hydrocarbons.

Figure 2:
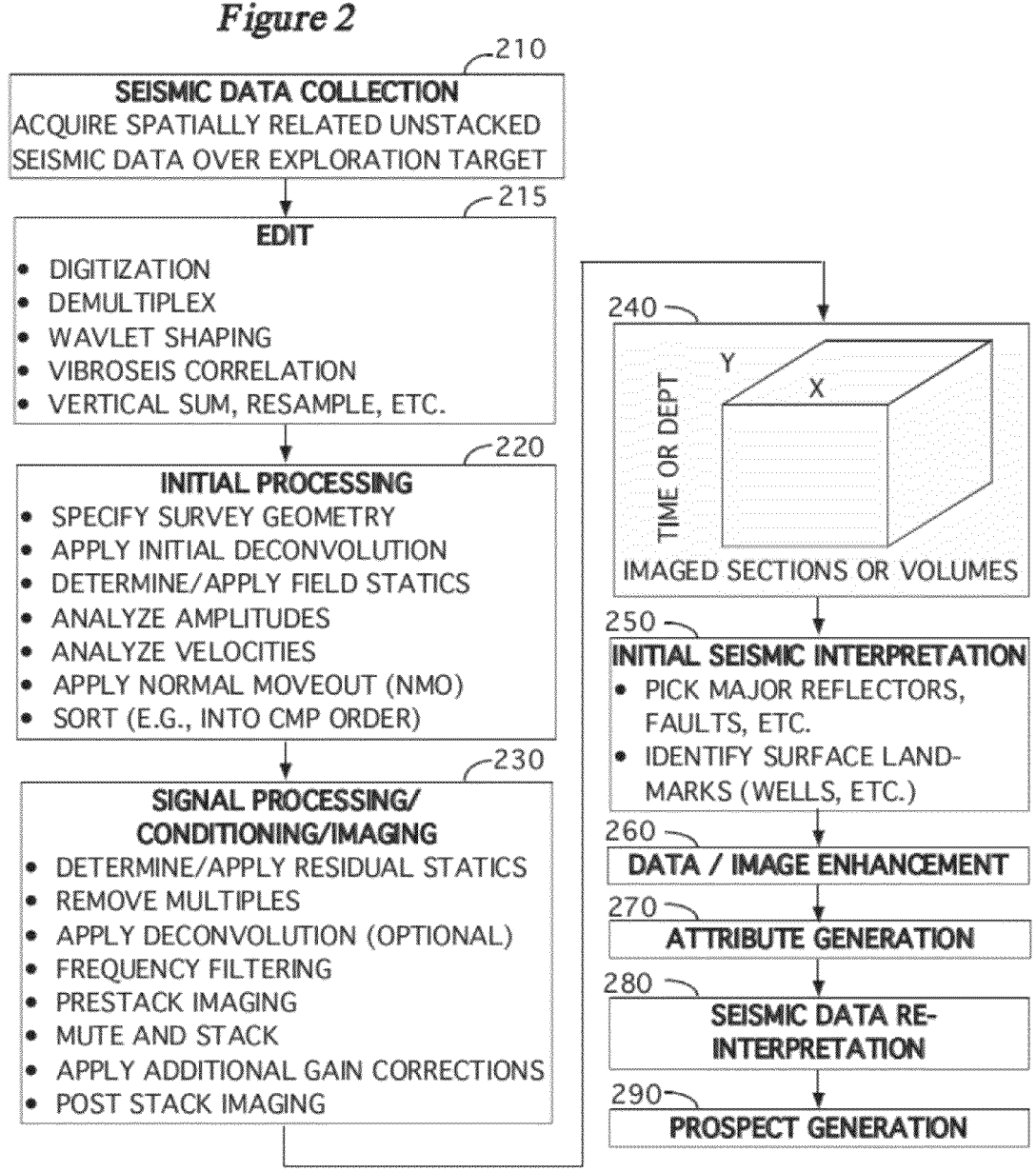
FIG. 2 illustrates a seismic processing sequence suitable for use with embodiments of the method.

As was indicated previously, embodiments of the method may, but not exclusively, be made a part of and incorporated into a conventional seismic processing sequence of the sort generally described in FIG. 2. Those of ordinary skill in the art will recognize that the processing steps illustrated in FIG. 2 are only broadly representative of the sorts of processes that might be applied to such data and the choice and order of the processing steps, and the particular algorithms involved, may vary markedly depending on the individual seismic processor, the signal source (dynamite, vibrator, Sosie™, mini-Sosie™, etc.), the survey location (land, sea, etc.) of the data, the company that processes the data, etc.

As a first step, and as is generally illustrated in FIG. 2, a 2-D or 3-D seismic survey is conducted over a particular volume of the earth's subsurface (step 210). The data collected in the field consist of unstacked (i.e., unsummed) seismic traces which contain digital information representative of the volume of the earth lying beneath the survey. Any methods known to those of skill in the art may be used to obtained and process data into a form suitable for use by seismic processors and interpreters. Note that for purposes of the instant disclosure, the seismic survey may be a blended source survey wherein reflections from a later source activation may interfere with (e.g., may overlap or coincide in time with) reflections from an earlier one. After the shots have been separated according to the instant invention, the unstacked seismic traces resulting from that operation are useable as would be any other collection of seismic traces.

The purpose of a seismic survey is to acquire a collection of spatially related seismic traces over a subsurface target of some potential economic importance. Data that are suitable for analysis by the methods disclosed herein might consist of, for purposes of illustration only, an unstacked 2-D seismic line, an unstacked 2-D seismic line extracted from a 3-D seismic survey or, an unstacked 3-D portion of a 3-D seismic survey. The invention disclosed herein is most effective when applied to a group of stacked seismic traces that have an underlying spatial relationship with respect to some subsurface geological feature. Again for purposes of illustration only, the discussion that follows will be couched in terms of traces contained within a 3-D survey (stacked or unstacked as the discussion warrants), although any assembled group of spatially related seismic traces could conceivably be used.

After the seismic data are acquired (step 210), they are typically taken to a processing center where some initial or preparatory processing steps are applied to them. As is illustrated in FIG. 2, a common early step 215 is designed to edit the input seismic data in preparation for subsequent processing (e.g., demux, gain recovery, wavelet shaping, bad trace removal, etc.). This might be followed by specification of the geometry of the survey (step 220) and storing of a shot/receiver number and a surface location as part of each seismic trace header. Once the geometry has been specified, it is customary to perform a velocity analysis and apply an NMO (normal move out) correction to correct each trace in time to account for signal arrival time delays caused by offset.

In some arrangements, the method may be utilized in connection with the preprocessing step 215, i.e., in conjunction with or in place of the wavelet shaping/Vibroseis® correlation steps, although it could certainly be utilized elsewhere within this generalized processing scheme.

After the initial pre-stack processing is completed, it is customary to condition the seismic signal on the unstacked seismic traces before creating stacked (or summed) data volumes (step 230). In FIG. 2 step 230 contains a typical "Signal Processing/Conditioning/Imaging" processing sequence, but those skilled in the art will recognize that many alternative processes could be used in place of the ones listed in the figure. In any case, the ultimate goal from the standpoint of the explorationist is the production of a stacked seismic volume or, in the case of 2-D data, a stacked seismic line for use in the exploration for hydrocarbons within the subsurface of the earth.

As is further suggested in FIG. 2, any digital sample within a stacked seismic volume is uniquely identified by a (X, Y, TIME) triplet, with the X and Y coordinates representing some position on the surface of the earth, and the time coordinate measuring a recorded arrival time within the seismic trace (step 240). For purposes of specificity, it will be assumed that the X direction corresponds to the "in-line" direction, and the Y measurement corresponds to the "cross-line" direction, as the terms "in-line" and "cross-line" are generally understood in the art. Although time is the most common vertical axis unit, those skilled in the art understand that other units are certainly possible might include, for example, depth or frequency. Additionally, it is possible to convert seismic traces from one axis unit (e.g., time) to another (e.g., depth) using any standard mathematical conversion techniques known to those of ordinary skill in the art.

The explorationist may do an initial interpretation 250 of the resulting stacked volume, wherein he or she locates and identifies the principal reflectors and faults wherever they occur in the data set. This might be followed by additional data enhancement 260 of the stacked or unstacked seismic data and/or attribute generation (step 270) therefrom. In many cases the explorationist will revisit his or her original interpretation in light of the additional information obtained from the data enhancement and attribute generation steps (step 280). As a final step, the explorationist will typically use information gleaned from the seismic data together with other sorts of data (magnetic surveys, gravity surveys, LANDSAT data, regional geological studies, well logs, well cores, etc.) to locate subsurface structural or stratigraphic features conducive to the generation, accumulation, or migration of hydrocarbons (i.e., prospect generation 290).

Embodiments of the Instant Invention

Figure 6:
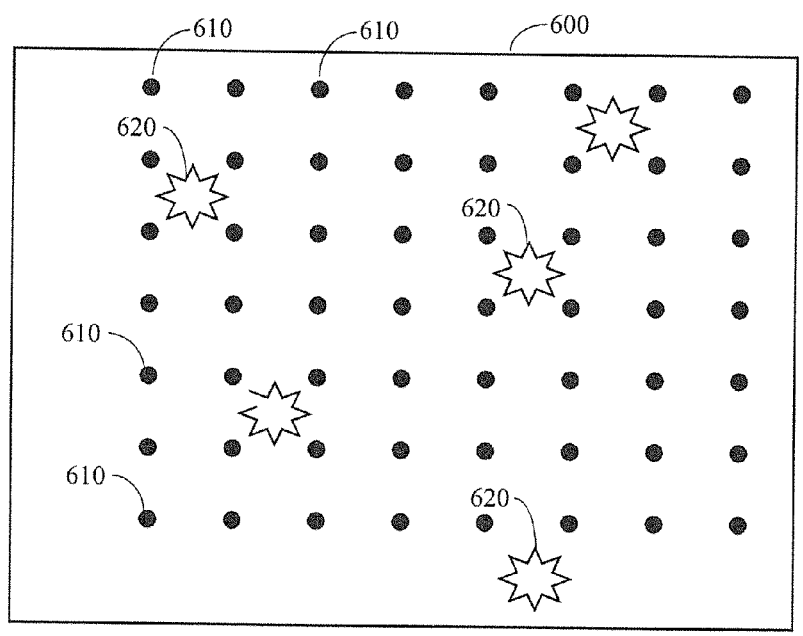
FIG. 6 contains a plan view schematic of a typical blended source survey.
Figure 7:
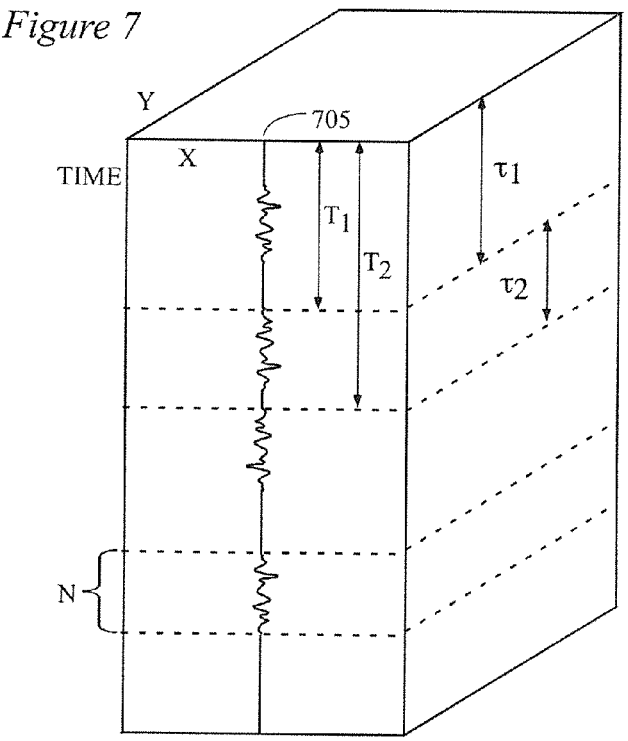
FIG. 7 illustrates schematically how different shots may be identified and extracted from within the blended source survey.

Turning next to FIGS. 6 and 7, a blended source land survey is typically collected by first laying out a number of receivers 610 in a 2-D configuration over a target of exploration interest. In some embodiments there may be only a few or as many as several thousand receivers 610 in the survey. The receivers 610 might be connected by cables to a central recording unit, they might use wireless transmission to same, or each receiver might contain some amount of internal data storage in which to record the seismic signals received thereby. Those of ordinary skill in the art will be quite familiar with these sorts of receiver variations and how this approach might be modified for a marine survey.

In one embodiment, the receivers 610 will be continuously recorded for an extended period of time. In some variations, the receivers might be recorded for a few hours, one-half day, a full day, multiple days, multiple months, etc. The recording may capture at least two source excitations. This is in contrast to the usual seismic survey, wherein the receivers are recorded for only a few seconds after the activation of a source.

During the time period that the receivers are being recorded, a number of seismic sources 620 may be activated at different locations within the survey area 600. In an embodiment two or more sources may be used. In the case of a marine survey, it is likely that two different sources (often being towed by two different vessels) may be used but that obviously is something that is left to the discretion of the survey designer. Further, in some embodiments the source activations may be separated in time by random time periods selected according to the methods discussed herein. In some variations the sources may be activated close enough in time that there may be some overlap or blending between the shots. That is, for example in the case of a land survey where each source 620 is a Vibroseis® unit, it is anticipated that the source activations might be separated by a few seconds in some cases. Note that FIG. 6 is not intended to suggest that each source 620 may be activated simultaneously but instead is indicated to indicate that each source is located at a different location within the survey area 600. During some surveys, ten or more different sources might be used. More particularly, fifteen or more sources may be used, alternatively twenty or more sources may be used.

When the data are acquired in a marine setting, the time intervals between successive shots may typically be designed to be random. More particularly, some amount of randomness may be introduced by shooting on position (i.e., activating the source when the boat reaches a predetermined position), since the exact arrival time at a shot point is at least somewhat random. However, this may not be a reliable way to introduce randomness into the activation times since the boat speed tends to be relatively constant and the shot points are typically evenly spaced. That being said, shooting exclusively on position may introduce sufficient randomization when the distance between shot points is large. As is explained in greater detail below and in accordance with one variation of the instant invention, some parameter associated with the distribution from which the randomness is introduced into the shot timing may be controlled by the lowest frequency of interest in the survey, and the expected variation of the shots from a regular interval should be at least one or more of such wavelengths. Thus, if the lowest frequency of interest produces a seismic wave that is on the order of 200 ins in length, the shot time separation could be a constant plus some random amount which might be, again, on the order of 200 ms or more.

In some embodiments, randomly spaced shot times and positions may be scheduled, with the shooting boat increasing or decreasing its speed as necessary to be at the chosen location at the assigned time. In other embodiments, the boat may be shooting on position, with the shot times being monitored for randomness. In this scenario, the boat may approach a designated position and then, rather than firing exactly on position, it may add or subtract some amount of time (e.g., a randomly generated time adjustment) to the anticipated arrival time so that the boat intentionally shoots a bit early or late. The time adjustment may be chosen to ensure that the distribution of shot times are at least approximately random. Also, the random increment may be chosen so that the boat is within some specified distance tolerance of the intended shot point. Finally, the increment may be chosen such that the maximum delay does not interfere with the movement of the other sources to the next short position. This might be done, for example, by checking the delay from the last shot to assure that it is not too close to the delay between the previous shots or by keeping track of the distribution of the shot times to check for and correct non-random patterns.

In some cases, the software that controls the airguns or other seismic sources (e.g., gas gun, marine vibrator, etc.) may need to determine the ship's location (e.g., via GPS), its anticipated arrival time, and the time since the previous shot (s) in order to create a distribution of shot activation times (or shot time intervals) with a component that is at least pseudo-random. Alternatively, this may be done without allowing more than two shots to overlap. That being said, embodiments of the method are fully general and can accommodate multiple shots that overlap.

Turning next to FIG. 7, this figure suggests in a general way what the data from a blended source survey might look like. Note that although each of the source activations in FIG. 7 are shown as distinct signals, in reality successive shots each would overlap each other to some extent. However, the sources have separated here to make clearer the concepts that are discussed below.

Each receiver 610 may give rise to a seismic trace (e.g., trace 705) that could potentially be tens of minutes or several hours (or days, months, etc.) in length. In this figure, the trace 705 is shown schematically as containing recorded signals from four different source excitations which, in a blended source survey. Associated with each receiver 610 may be a location on the surface of the earth. When the signals that have been recorded from each receiver 610 are properly arranged and displayed, in one embodiment a 3-D volume may be produced with each receiver 610 being associated with an "X" and a "Y" location, to include locations based on latitude and longitude, etc.

During a blended source survey according to one aspect of the disclosed method, the time at which each source 620 is activated may be noted and recorded, which sources might be located inside or outside of the receiver field. In FIG. 7, $T_1$ and $T_2$ represent the known times (as measured from an arbitrary zero time) at which two sources were activated, with the parameter "N" indicating in a general way the length of time (number of samples) after the source activation during which reflections from the subsurface from a source might be sensed. The time separations between successive shots are denoted as $\tau_1, \tau_2$, etc.

Turning now to a discussion of how the random spacing may be determined, according to a first embodiment of the instant invention, there is provided a method of acquiring contemporaneously activated seismic sources such that they can be more readily and accurately separated thereafter. In brief, the disclosed method creates time spacing between overlapping sources, wherein the spacing is randomized based on the expected frequency content of the data.

Although there has been much discussion about what magnitudes of the random time separations produce the best results, there is little quantitative guidance as to how much randomness should be implemented. However, the embodiments of the disclosed method, without being limited by theory, show that the quality of the separation of the shots may depend to a large extent on the lowest frequency desired and the size of the random shifts between shots within a given analysis window.

It has been shown that, for the blending of data used for speeding up migration imaging, there is a crosstalk strength term which varies as a function of frequency ($\omega$) and the time separation between traces ($\tau$):

$$\sin^2(\omega\tau)/(\omega\tau)^2,$$

Figure 3:
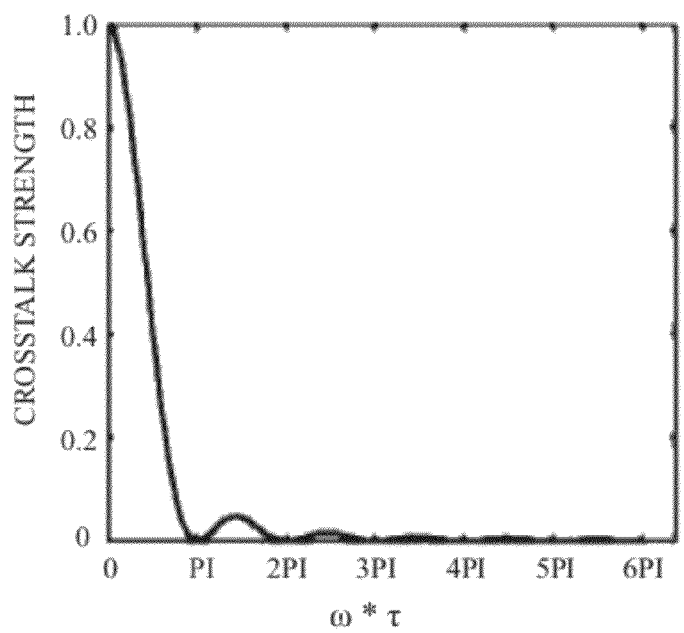
FIG. 3 contains a plot of crosstalk strength versus $\tau\omega$ for a single frequency.

FIG. 3 contains a plot of crosstalk strength versus. $\omega\tau$. In this figure the crosstalk strength is the vertical axis and $\omega\tau$ is the horizontal axis. Note that the first zero of this equation occurs at $\omega\tau=\pi$. This value of $\omega\tau$ makes a reasonable limiting value for the power of the crosstalk with respect to $\omega$ and $\tau$. Since $f=2\pi\omega$, it follows that the theoretical value of $\tau$ to obtain zero crosstalk for a given frequency is $$\tau=1/(2f).$$

Figure 4:
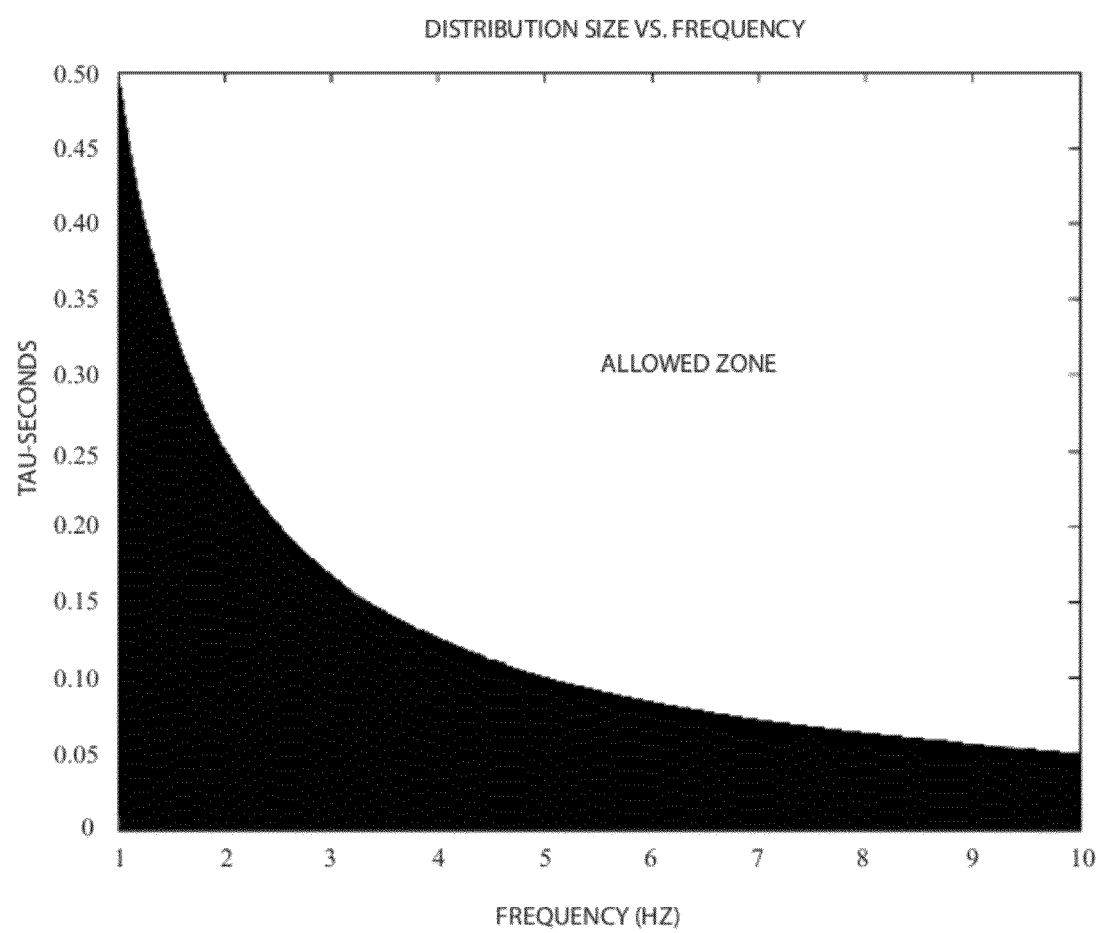
FIG. 4 contains a generalized plot of $\tau=1/(2 f)$ which shows the limits of separation with respect to frequency and tau.

This equation is plotted in FIG. 4.

This equation defines a quantitative model for choosing a workable time separation between successive/overlapping shots in a blended source survey. As can be seen from FIG. 4, for a given frequency, a uniform random distribution with a half-width of at least $\tau$ is usually a very good or near optimal choice for good quality separation of sources. The area in the zone below the curve shows where a combination of $\omega$ and $\tau$ would be expected to give poor results. The area above the curve is where the combination of $\omega$ and $\tau$ would be predicted to produce good results.

For example, if very good separation is desired, the value of tau might be chosen to be well above the curve. If poorer separation is acceptable, the value of tau might be chosen to be somewhat below the curve to allow a more flexible acquisition schedule. The trade off, of course, is that the larger tau is the longer the survey may take and the more it may cost. Thus, the maximum acceptable value of tau may, practically speaking, be constrained by economic considerations and there may typically an incentive to chose tau to be as close to the curve of FIG. 4 as is possible for a given data set.

Figure 5:
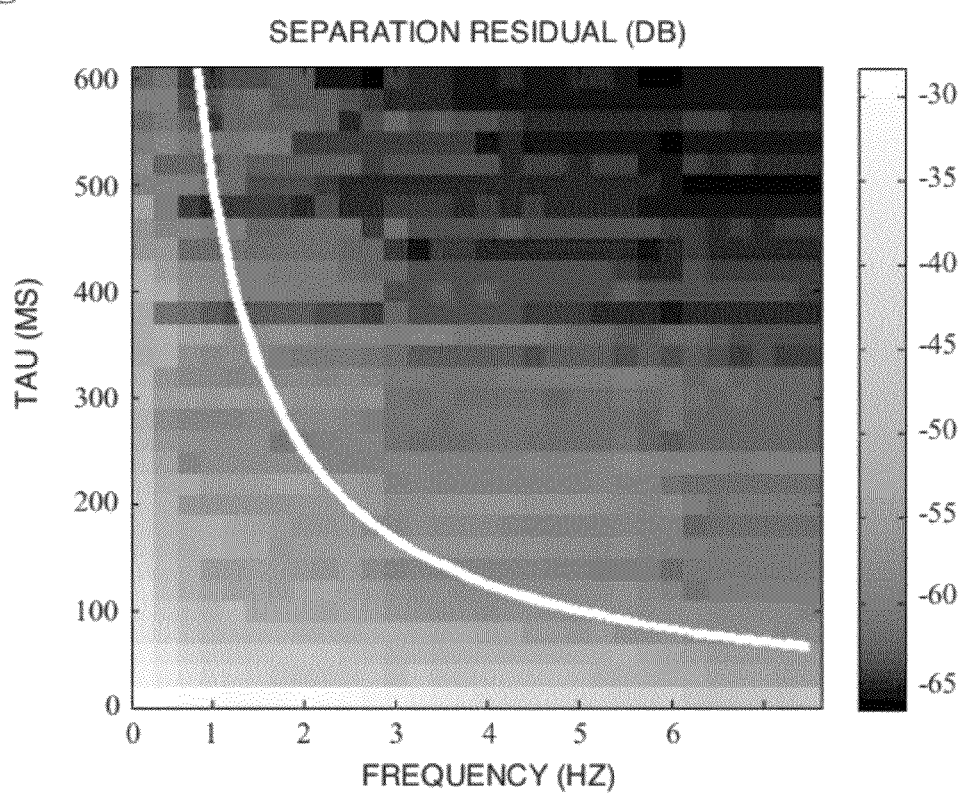
FIG. 5 contains the results of a numerical simulation to determine crosstalk strength as a function of $\tau$ and f. The curve that is shown in FIG. 4 is superimposed on this figure. Residuals are plotted in DB.

FIG. 5 illustrates the results of some numerical experiments where synthetic data were created with a range of frequencies and blended these data with a range of time shifts with a uniform distribution half-width of $\tau$. An inversion was calculated for each combination of tau and frequency and the residual, which is a measure of the difference between the calculated data and the data before blending, is displayed in this figure. It can be seen that, generally speaking, the separation quality roughly follows the limits above (e.g., the smallest values tend to be found in the upper right corner, whereas the larger values tend to be found in the lower left corner). This observation is consistent with the discussion associated with FIG. 4, wherein it was shown that the best results were likely to be found above and/or to the right of the curve that has been drawn there. As an aid to understanding FIG. 5, the curve from FIG. 4 has been superimposed on this figure. The residuals in FIG. 5 are plotted in DB.

In practice, there is likely to be some randomness in the shot time that allows separation using a coherency criterion, in view of the foregoing a purely random sequence is unlikely to be optimal, especially with the large number of shots used on a typical seismic survey. Random sequences may contain undesired random regularities that may affect the separation quality. Since the coherency is calculated within a limited window in space, a series of random numbers of only a limited length is needed. This set of random numbers in some embodiments may be chosen from a large sample of sequences of uniform random number series (or generated using, for example, a pseudo-random number generator) to produce the best separation.

As an example of how this might be done, a series of random numbers, say 101 long, might be picked out of a collection of 100000 sets of 101 random number series. Each of the 100000 sets of 101 random numbers could be examined for how good a separation it produces. The best series would be used in creating the random time shifts used to acquire the simultaneous source survey.

Continuing with the previous example, for 2D datasets the series would be reused along the line, cycling thought the 101 numbers along the shot line. For 3D datasets using the same set of random numbers on each shot line would create undesired regularities in the crossline direction. One method of avoiding this regularity would be to create a random set of indices into the series of 101 random numbers. These indices would be used to choose the starting random number from the series for each line. One method of avoiding undesired regularities in the random set of indices would be to constrain each index to be outside a given range of the last several lines. For example, if the coherency window is 8 traces in the crossline direction and 10 in the inline direction, each index would be constrained to not repeat within 8 lines, and each index would not be within 10 elements of another index. Another method of choosing indices would be to choose a set of random numbers and simply test a large number of random sets of indices to see which produces the best separation. While this would be computationally expensive, it would need to be done only once.

In practice, in instances where the random or otherwise obtained adjustment value is negative, the operator may fire the shot ahead of the planned time. For example, in a marine setting if the adjustment were to be prescribed to be −0.2 seconds, the ship might be either be slightly accelerated to reach the next shot point ahead of its scheduled (for example) 5 second shot interval. Alternatively, the shot might be fired early, e.g., before the actual shot point is reached. Given that marine location/positioning technology is accurate to only about 1 meter, firing slightly early (or late) could very well still be seen as firing on the shot point for purposes of positioning the recorded traces. Finally, delays and early arrivals due to wind, waves, etc., may swamp the small time adjustments of the instant methods but, in some embodiments, the crew may be instructed to shoot as close to the prescribed time as is possible.

As an alternative to scheduling times, random times may be obtained by adding randomness to the actual shot positions. Assuming, in the case of a marine survey, that the boat speed is constant, the randomness in times could be controlled by the randomness in position. One advantage of this approach is that the survey could be reacquired, say for time-lapse measurements, with the same random shot positions. It is likely to be easier to repeat shot positions than random times. Another advantage of this method is that it would not require any changes to the gun control software as would be needed to introduce random times.

After the data have been acquired, the recordings may typically be separated into individual traces by inversion using the method disclosed in U.S. patent application Ser. No. 12/542,433, Method for separating independent simultaneous sources, filed on Aug. 17, 2008, the disclosure of which is incorporated herein as if fully set out at this point, although other methods of separating or stacking out interference would require similar limits to the random time perturbations.

In some embodiments the method may be adapted for use with a VSP, checkshot, or similar downhole survey. By way of explanation, those of ordinary skill in the art may understand that VSP acquisition can be very expensive in terms of rig down time. Shooting faster VSPs with overlapping sources could be used to significantly reduce the costs of such surveys. Thus, when the phrase "blended seismic survey" is used herein, that phrase should be broadly interpreted to include both land and marine 2D and 3-D surveys as well as VSPs, cross hole surveys, etc.

Note that when the phrases such as "lowest frequency of interest," "lowest desired frequency," etc., are used herein, those phrases should be broadly construed to mean a frequency that is within the seismic source and/or recording bandwidths and that is, practically speaking, likely to be the lowest useful frequency returned from the seismic survey.

Additionally, although the preferred embodiment utilizes the relationship $\tau=1/(2f)$ as a means of defining the minimum acceptable time separation as a function of frequency, it should be noted that there are many other curves that might approximate this relationship over some range of frequencies. For example, between 1 Hz and 6 Hz, the equation the tau/frequency relationship can be acceptably approximated by a second or higher degree polynomial in frequency (e.g., obtained via standard least squares or other fitting techniques). Higher polynomials (or other functional forms such as exponentials, logs, etc.) could provide a better fit. Over other frequency ranges, (e.g., 3 Hz to 6 Hz) even a linear approximation could provide useful information. Thus, it should be understood for purposes herein that when it is said that the above-identified equation is used to find an acceptable tau, that language should be broadly interpreted to include instances where functional or numerical approximations to that curve (over short intervals or its entire length) are used instead.

Further, it should be noted that the figures and examples that are included herewith were generated under the assumption that the random time separations between successive source activations were drawn from a uniform probability distribution centered about zero with a half-width of tau. The fact that the distribution was centered about zero (i.e., the uniform distribution has an expected value equal to zero) is only one approach and the distribution certainly could be shifted (either toward positive or negative values) by having the distribution centered around a non-zero value, thereby producing random time separations that are biased toward positive (or negative) values.

Still further, note that different probability functions could be used instead of the uniform in order to generate the random time separations. In such an instance, it may be advantageous to select a parameter of the distribution such as the standard deviation (or variance or other measure of variability or spread or some other measure of central tendency such as a mean, median, etc.)) to be some function of (1/f). In the case of the example discussed previously, a uniform distribution centered about zero with half-width equal to tau may have a variance $s^2$ equal to:

$$s^2 = \frac{\tau^2}{3} = \frac{1}{12f^2},$$

or, $$s = \frac{\tau}{\sqrt{3}} = \frac{1}{2\sqrt{3}\,f}.$$

Said another way, this equation indicates that if tau is chosen to be on the ½f curve, the variance of the associated uniform distribution is $1/(12f^2)$.

This suggests that, generally speaking, the lowest frequency of interest should be related to a parameter of the probability distribution from which the random time differences are drawn. More particularly and by way of example, in some embodiments the variability of the distribution from which the random times are drawn should be related to (proportional to, a function of etc.) the inverse of the lowest frequency of interest in the survey (e.g., [1/Cf,] where C is a constant). An acceptable relationship between variability and frequency may likely need to be determined on a case-by-case basis depending on the choice of the probability density function and by trade-offs due to economic reasons. By way of example only, one way to develop the curve of FIG. 5 for a non-uniform distribution would be to calculate the surface of FIG. 4 and identify an iso-residual curve that more or less divides the acceptable from non-acceptable residuals. That being said, one of ordinary skill in the art would be readily capable of devising other ways to obtain such a curve (e.g., Monte Carlo simulation).

In the previous discussion, the language has been expressed in terms of operations performed on conventional seismic data. But, it is understood by those skilled in the art that the invention herein described could be applied advantageously in other subject matter areas, and used to locate other subsurface minerals besides hydrocarbons.

While the inventive device has been described and illustrated herein by reference to certain embodiments in relation to the drawings attached hereto, various changes and further modifications, apart from those shown or suggested herein, may be made therein by those skilled in the art, without departing from the spirit of the inventive concept, the scope of which is to be determined by the following claims.

What is claimed is:

1. A method of seismic exploration above a region of the subsurface containing structural or stratigraphic features conducive to the presence, migration, or accumulation of hydrocarbons, comprising:
    a. determining a lowest frequency of interest in a blended source seismic survey;
    b. using said lowest frequency of interest to determine a value representative of variability of a probability distribution;
    c. initiating a recording of at least one seismic receiver positioned proximate to the region of the subsurface;
    d. activating a first seismic source;
    e. recording said first seismic source through said at least one of seismic receiver;
    f. determining a random period of time using said probability distribution and said determined value representative of variability;
    g. waiting a period of time at least approximately equal to said random period of time after said first seismic source activation and then activating a second seismic source;
    h. recording said second seismic source through said at least one seismic receiver;
    i. performing at least (d) through (h) a plurality of times, thereby acquiring a blended source seismic survey; and,
    j. using said blended source seismic survey to explore for hydrocarbons within said region of the subsurface.

2. The method of claim 1, wherein said probability distribution is a uniform probability distribution.

3. The method of claim 2,
    wherein said uniform probability distribution has a half-width of tau,
    wherein said tau is said value representative of a variability of said uniform probability distribution, and
    wherein $\tau = 1/(2f)$, with f being said lowest frequency of interest.

4. The method of claim 3, wherein said uniform probability distribution is centered about zero.

5. The method of seismic exploration according to claim 1, wherein said at least one seismic receiver comprises a plurality of seismic receivers.

6. The method of claim 1 wherein the first seismic source and the second seismic source are both impulsive sources.

7. The method of claim 1 wherein the first seismic source and the second seismic source are both marine sources.

8. The method of claim 1 wherein the first seismic source and the second seismic source are land sources.

9. The method of claim 7, wherein the first seismic source and the second seismic source are selected from a group consisting of an airgun, a gas gun, and a vibrator.

10. The method of claim 8, wherein the first seismic source and the second seismic source are selected from a group consisting of a dynamite source and a vibrator source.

11. The method of seismic exploration according to claim 1, wherein said first seismic source and said second seismic source are a same seismic source.

12. A method of acquiring a blended source seismic survey above a region of the subsurface containing structural or stratigraphic features conducive to the presence, migration, or accumulation of hydrocarbons, comprising:
    a. determining a lowest frequency of interest in said blended source seismic survey;
    b. using said lowest frequency of interest to determine a value representative of at least one parameter of a probability distribution;
    c. initiating a recording of at least one seismic receiver situated proximate to the region of the subsurface;
    d. activating a first seismic source;
    e. using said at least one seismic receiver to record one or more reflections sourced by said first seismic source activation;
    f. using said probability distribution and said value representative of at least one parameter of said probability distribution to determine a time delay;
    g. waiting a period of time at least approximately equal to said time delay after said first source activation before activating a second seismic source;
    h. recording said second seismic source through said at least one seismic receiver;
    i. performing at least (d) through (h) a plurality of times, thereby acquiring a blended source seismic survey; and,
    j. using at least a portion of said blended source seismic survey to explore for hydrocarbons within said region of the subsurface.

13. A method of seismic exploration, comprising:
    a. accessing at least a portion of a blended source seismic survey taken above a region of the subsurface containing structural or stratigraphic features conducive to the presence, migration, or accumulation of hydrocarbons, wherein said blended source seismic survey is collected by:
        (1) determining a lowest frequency of interest in the blended source seismic survey;
        (2) using said lowest frequency of interest to determine a value representative of variability of a probability distribution;
        (3) initiating a recording of at least one seismic receiver positioned proximate to the region of the subsurface;
        (4) activating a first seismic source;
        (5) recording said first seismic source through said at least one of seismic receiver;
        (6) determining a random period of time using said probability distribution and said determined value representative of variability;
        (7) waiting a period of time at least approximately equal to said random period of time after said first seismic source activation and then activating a second seismic source;
        (8) recording said second seismic source through said at least one seismic receiver; and,
        (9) performing at least (4) through (8) a plurality of times, thereby acquiring said blended source seismic survey; and,
    b. using at least a portion of said blended source seismic survey to explore for hydrocarbons within said region of the subsurface.

* * * * *